United States Patent [19]
Bermes et al.

[11] Patent Number: 5,697,623
[45] Date of Patent: Dec. 16, 1997

[54] APPARATUS FOR TRANSPORTING OPERATOR BEHIND SELF-PROPELLED VEHICLE

[75] Inventors: Gregory J. Bermes; Steven P. Bermes, both of Fort Wayne, Ind.

[73] Assignee: Novae Corp., Fort Wayne, Ind.

[21] Appl. No.: 539,055

[22] Filed: Oct. 4, 1995

Related U.S. Application Data

[63] Continuation-in-part of Ser. No. 453,216, May 30, 1995, Pat. No. 5,575,140.

[51] Int. Cl.⁶ ............................................. B62D 63/00
[52] U.S. Cl. ................... 280/32.7; 280/166; 180/19.1; 56/2; 56/14.7; 172/433
[58] Field of Search ..................... 280/32.7, 32.5, 280/78, 163, 164.1, 166; 180/19.1, 19.3; 56/1, 2, 14.7, 16.7, 228, 323, DIG. 9; 172/433

[56] References Cited

U.S. PATENT DOCUMENTS

| | | | |
|---|---|---|---|
| D. 243,161 | 1/1977 | Tolar | D12/1 |
| 1,764,971 | 6/1930 | Nilson | 280/402 |
| 2,657,408 | 11/1953 | Machovec | 180/19.1 |
| 2,955,835 | 10/1960 | Chouinard | 286/43 |
| 3,190,672 | 6/1965 | Swanson et al. | 280/32.7 |
| 3,336,042 | 8/1967 | Southall | 280/32.7 |
| 3,485,314 | 12/1969 | Herr | 180/19.1 |
| 3,980,319 | 9/1976 | Kirkpatrick | 280/166 |
| 4,010,507 | 3/1977 | Johnson | 280/32.7 |
| 4,175,762 | 11/1979 | Vaughn et al. | 280/78 |
| 4,828,282 | 5/1989 | Pinto | 280/32.7 X |
| 4,848,504 | 7/1989 | Olson | 180/19.1 |
| 4,878,339 | 11/1989 | Marier et al. | 56/14.7 |
| 4,982,974 | 1/1991 | Guidry | 280/166 X |
| 4,989,351 | 2/1991 | Shear | 280/32.7 X |
| 4,998,948 | 3/1991 | Osterling | 56/12.6 |
| 5,004,251 | 4/1991 | Velke et al. | 280/78 X |
| 5,117,944 | 6/1992 | Hurtevent | 280/32.7 X |
| 5,118,123 | 6/1992 | Betrock | 280/32.7 |
| 5,388,850 | 2/1995 | Simone | 280/32.7 |
| 5,413,364 | 5/1995 | Hafendorfer | 280/32.7 |

OTHER PUBLICATIONS

Product brochure, Turf Rider Inc.
Product Brochure, Wright Manufacturing, Inc.
Product brochure, Jungle Jim's Accessory Products, Inc.

*Primary Examiner*—Kevin Hurley
*Attorney, Agent, or Firm*—George Pappas

[57] ABSTRACT

An apparatus in combination with or attachable to a self-propelled vehicle such as a lawn mower for transporting the operator therebehind. The apparatus includes a first arm pivotally connected to the lawn mower and adapted to pivot about a first generally horizontally disposed axis of rotation. A support platform is pivotally connected to the other end of the arm about a second axis of rotation which is also horizontally disposed and which is parallel to the first axis of rotation. A spring member is provided and biases the first arm upwardly for placing the apparatus in a retracted storage position. The apparatus is selectively placeable in an extended in use position during which the operator stands on the support platform and rides behind the self-propelled lawn mower. The support platform includes a sliding plate for sliding on the ground and reducing frictional forces when the operator is standing on the support platform.

26 Claims, 13 Drawing Sheets

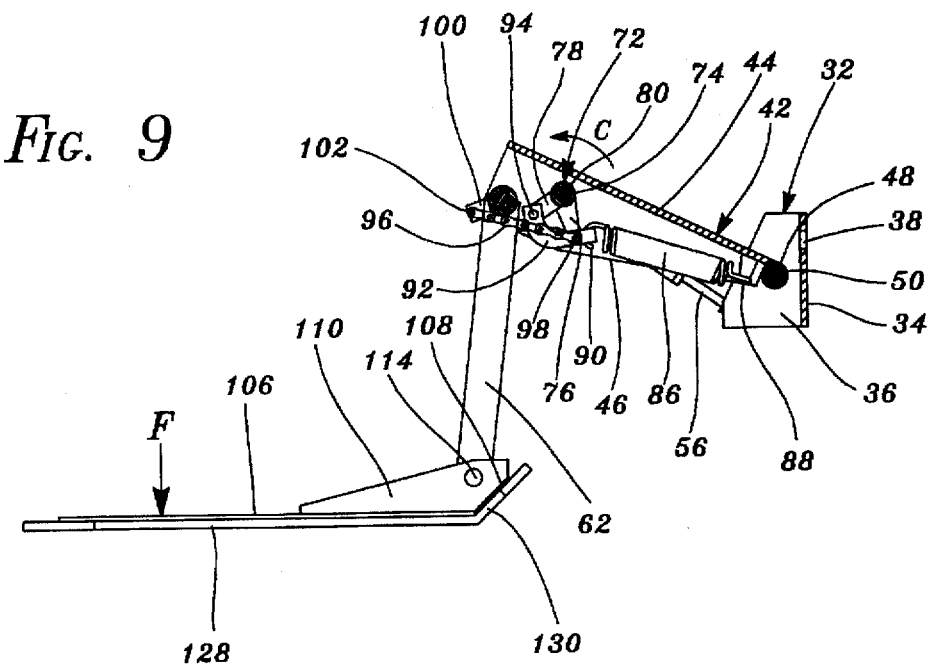
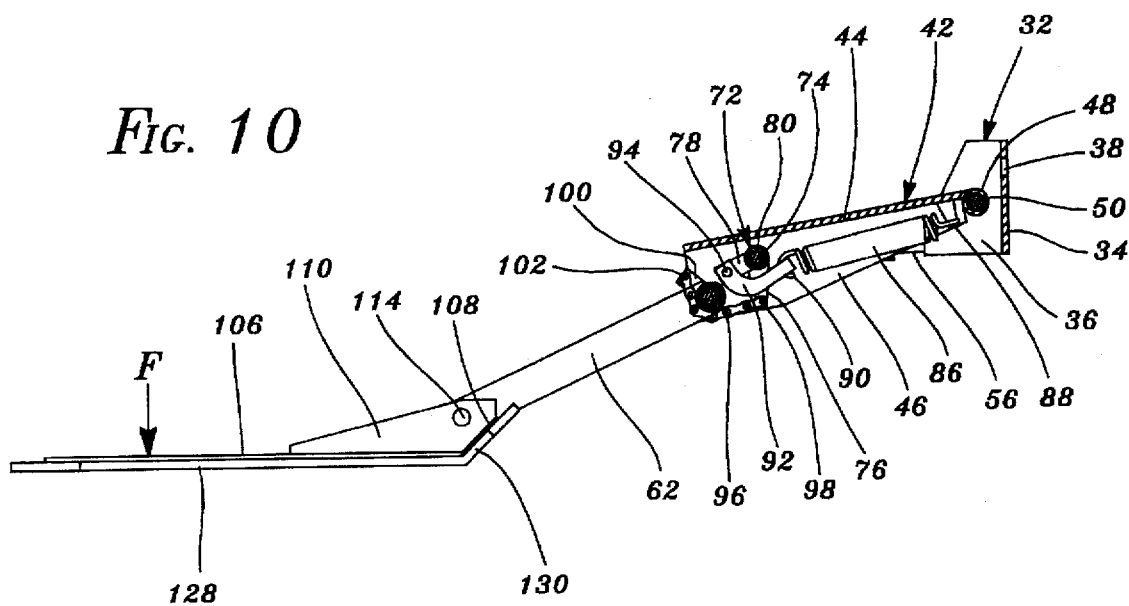

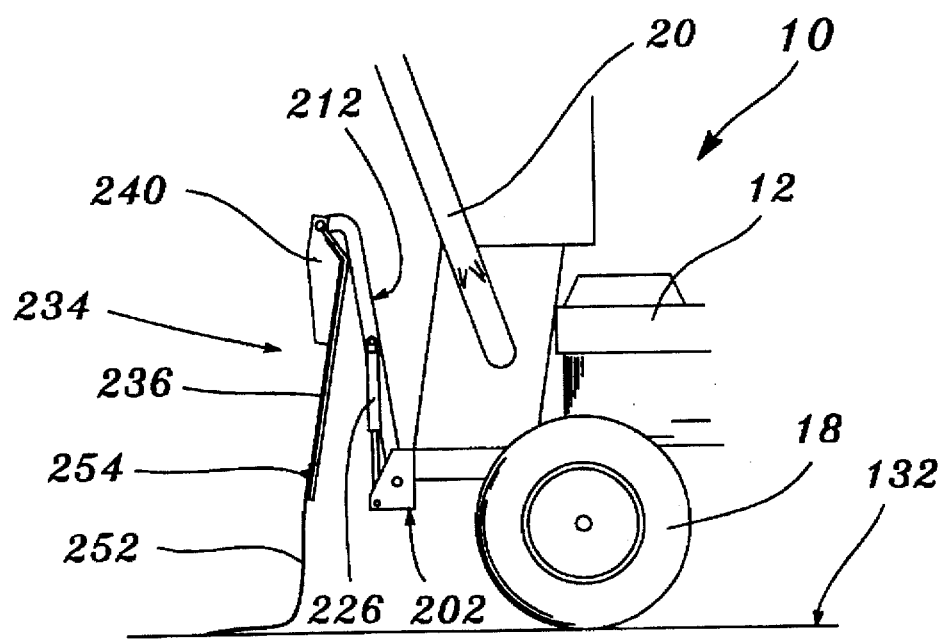
FIG. 17
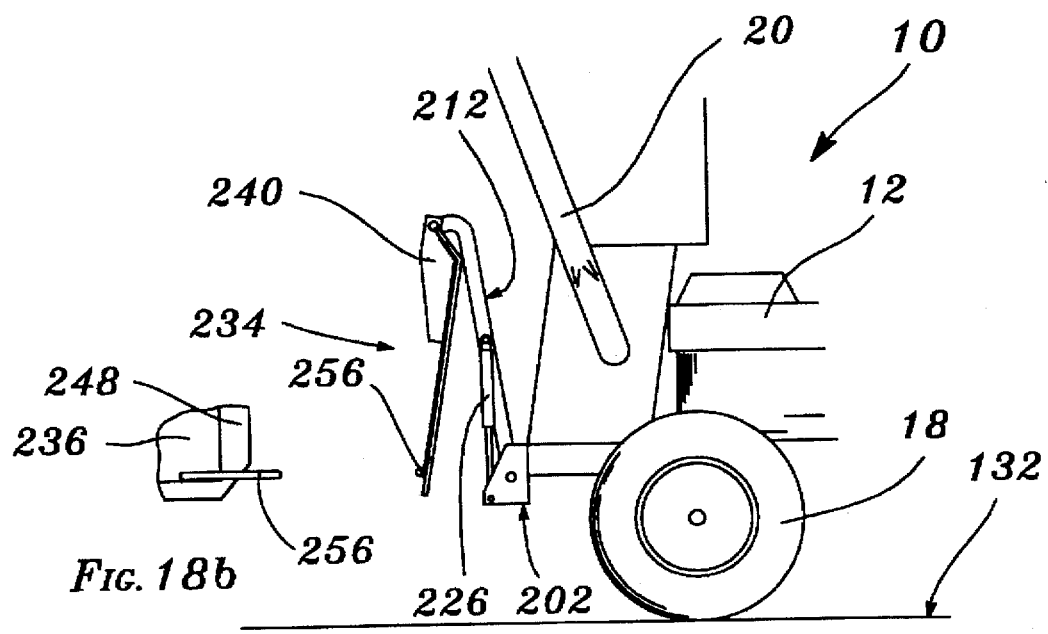
FIG. 18a
FIG. 18b 5,697,623

APPARATUS FOR TRANSPORTING OPERATOR BEHIND SELF-PROPELLED VEHICLE

This application is a continuation-in-part of application Ser. No. 08/453,216 filed on May 30, 1995 U.S. Pat. No. 5,575,140.

TECHNICAL FIELD

The present invention generally relates to the technical field of self-propelled vehicles such as self-propelled lawn mowers. More specifically, the present invention relates to an apparatus that is in combination with or attachable to the rear of the self-propelled vehicle and which is used for transporting the operator behind the self-propelled vehicle.

BACKGROUND OF THE INVENTION

Numerous apparatus have, in the past, been conceived for transporting an operator behind a self-propelled vehicle that is normally used by the operator by walking therebehind. Vehicles of this character typically include self-propelled lawn mowers, sweepers, snow blowers, etc. The operator carrying and transporting apparatus, also typically known as a caddie or sulky, can be permanently attached to the self-propelled vehicle or detachably attachable thereto. Such self-propelled vehicles typically always include a set of arms with handles thereon that are selectively grasped by the operator and which are used for guiding the vehicle. Control of the vehicle's speed and other operations are also typically accomplished by levers and other mechanisms located generally close to the handles and which are typically easily reached and used by the operator. Additionally, such vehicles are generally powered by a combustion engine of a sufficient size and are geared appropriately, not only to accomplish the needed task of cutting grass, throwing snow, sweeping, etc., but also for propelling the vehicle at a desired speed. The combustion engine is also typically of sufficient size to pull therebehind the apparatus whereupon the operator may stand and be transported along with the self-propelled vehicle. In this fashion, the operator need only stand on the apparatus guiding and controlling the various functions of the vehicle for accomplishing the desired end result.

An example of an apparatus for transporting the operator behind a self-propelled lawn mower is shown in U.S. Pat. No. 4,828,282. There, a caddie supported on two wheels is selectively pivotally hitched to the rear of a self-propelled lawn mower. Advantageously, the operator need only stand on the caddie and control the self-propelled lawn mower by use of the arms and thereby maneuvering the lawn mower as may be needed around shrubbery, trees, etc. Another similar apparatus is shown in U.S. Pat. No. 4,989,351 wherein a platform supported on a pair of wheels is again selectively hitched to the rear of a self-propelled vehicle, here a self-propelled snow thrower. Although these apparatus are capable of supporting and transporting the operator behind the self-propelled vehicle, in practice, they are difficult to use because the operator cannot easily and quickly switch between a walk behind mode of operation and a ride behind mode of operation. Quite often, especially in tight radius turning and where forward and reverse motion is changed rapidly, it is desirable for the operator to merely walk behind the vehicle rather than ride. At other times, the operator may desire to walk behind the vehicle due to the terrain i.e., very bumpy, high slope, etc. It is also typically more desirable and easy to walk behind the vehicle when traveling in reverse. Unfortunately, the prior hitch-on type caddies are not easily detachable and the operator is forced to either walk to the side of the hitched caddie and vehicle or go through the attachment and detachment operation each time the mode of operation is required to be changed. As can be appreciated, walking to the side of the vehicle and apparatus is awkward. Operating the vehicle in reverse may cause jackknifing, and can be dangerous. Additionally, constantly detaching or attaching the apparatus to the vehicle is laborious, time-consuming, and not cost effective.

Apparatus for transporting the operator behind a self-propelled vehicle and which are selectively placed between a retracted walk behind storage position and an in use ride behind position have also been conceived and examples of such devices are shown in U.S. Pat. No. 3,485,314, 4,878, 339 and 5,004,251. Unfortunately, in each case these devices require at least some support from the control arms. Additionally, the operation of each apparatus greatly depends on the self-propelled vehicle structure and each such apparatus are not easily readily adaptable for use with other self-propelled vehicles. For example, in U.S. Pat. No. 4,878,339 the operator support platform, when in use, is supported by a pair of rods extending up to the control arms and, for the walk behind mode the platform is pivoted and stored under the self-propelled lawn mower. Unfortunately, many self-propelled lawn mowers do not have sufficient clearance for easily pivoting and storing the support platform thereunder and thereby making such apparatus impractical for different vehicles. Further, in the case of apparatus shown in U.S. Pat. No. 3,485,314 and 5,004,251 placement of the apparatus in its storage position requires the operator to manually lift and latch the apparatus in its storage position. As can be appreciated, these apparatus again are laborious, time-consuming, and not cost effective, especially during uses of the vehicle where the operator must switch quite often between the walk behind and the ride behind modes of operation.

Accordingly, a need exists for an apparatus for attachment and use with a self-propelled vehicle for selectively transporting the operator therebehind and which is easily adaptable for use behind different makes and models of self-propelled vehicles and which is easily and readily placed in a retracted storage position during which the operator walks behind the vehicle and an extended in use position during which the operator stands on the apparatus and rides along with the vehicle therebehind.

SUMMARY OF THE INVENTION

It is the principal object of the present invention to overcome the above-discussed disadvantages associated with prior apparatus for transporting operators behind self-propelled vehicles.

The present invention overcomes the disadvantages associated with prior apparatus for transporting operators behind self-propelled vehicles by providing an apparatus that is attachable to a rear wall of the self-propelled vehicle. The apparatus is attached to the self-propelled vehicle either directly or via an attachment member.

In summary, the inventive apparatus includes an arm having a first end adapted to be pivotally connected to a self-propelled vehicle such as a lawn mower and pivot about a generally horizontally disposed first axis of rotation. The arm can be pivotally connected directly to the rear wall of the vehicle or, in the alternative, to an attachment member that is in turn attached to a rear wall of the vehicle. An operator support platform is pivotally attached to the arm second end and is itself adapted to pivot about a second axis of rotation that is also generally horizontally disposed. Further, the second axis of rotation is generally parallel to the first axis of rotation. Accordingly, the arm and support platform are selectively pivotable about the first and second axes of rotation so as to selectively place the support platform either in a retracted storage position during which it is out of the way and the operator may walk behind the vehicle or place the support platform in an extended in use position for carrying and transporting the operator behind the self-propelled vehicle. In the extended in use position, the support platform is in contact with and slides on the surface therebelow.

A spring member is provided between the arm and either the attachment member or the rear wall of the self-propelled vehicle and is adapted to bias the arm generally upwardly. Accordingly, in its retracted storage position the arm is pivoted in a position directed generally upwardly from the first axis of rotation while the support platform is directed and hangs generally downwardly from the arm second end or second axis of rotation. Thus, in its storage position, the apparatus is retracted up and close to the self-propelled vehicle and out of the operators way for walking therebehind.

For extending the apparatus in its in use position, a flexible strap is attached to the support platform and extends downwardly therefrom partially resting on the surface therebelow. The operator selectively steps on the strap while causing the self-propelled vehicle to move forwardly thereby causing the support platform and arm to be pulled backwardly pivoting against the biasing force of the spring. As the apparatus is being extended, the arm pivots in one direction downwardly and about the first axis of rotation while the support platform rotates in the opposite direction about the second axis of rotation. In this manner, the apparatus becomes fully extended with the support platform resting on the ground or other surface and the operator merely steps thereon thereby being carried and transported behind the self-propelled vehicle. As an alternative to the flexible strap, it is contemplated that a step member be provided and affixed to the support platform in a manner whereby the operator can place his foot on the step member thereby pushing downwardly and placing the support platform and arm in their extended in use position.

In an alternate embodiment, the support platform is affixed to the second end of the arm and pivots with the arm about the first generally horizontally disposed axis of rotation. In its retracted storage position, a mechanism is provided for attaching and supporting the arm and support platform from the vehicle control handle assembly. In its extended in use position, the arm and support platform extend down and backwardly from the self-propelled vehicle and the support platform is in contact with and slides on the surface therebelow for carrying and transporting the operator.

In another embodiment a first arm is pivotally connected to the attachment member or directly to a rear wall of the vehicle. A second arm is pivotally connected to the first arm and an operator support platform is pivotally connected to the second arm. The first and second arms and the support platform are spring biased so as to be retractable in a storage position during which the first and second arms and the support platform are positioned in different planes but generally parallel to one another. In the storage or walk behind position, the first and second arms and the support platform extend upwardly from the rear of the vehicle and away from the area whereat the operator requires for walking behind the vehicle.

For placing the apparatus in the ride behind mode, the operator need only reach up with his foot and step down on the support platform working against the bias forces of the springs and causing the first and second arms and support platform to be extended in the in use or ride behind position for carrying and transporting the operator behind the self-propelled vehicle. The support platform includes a sliding plate that comes in contact and slides on the surface therebelow i.e., grass, dirt, concrete, etc., while the operator is merely standing and is being transported on the support platform. For placement back in the retracted storage position, the operator steps off of the support platform allowing the springs to pivotally move and place the first and second arms and support platform in the retracted storage position.

Preferably, a first spring is provided between the first arm and the attachment member or the vehicle rear wall for biasing the first arm generally upwardly. This first spring can be a compression spring, pneumatic cylinder, gas spring, torsion spring, or other spring mechanisms for accomplishing the necessary biasing. A second spring mechanism is also provided for torsionally biasing the first and second arms about the pivotal connection therebetween and toward each other. This spring mechanism can be a torsion spring. Alternatively, a pivot member can be provided and pivotally connected to the first arm and a second spring connected between the pivot member and the first arm thereby pivotally biasing the pivot member. A coupling member such as a chain is connected between the pivot member and the second arm thereby torsionally biasing the first and second arms toward each other. A third spring is also provided and is connected between the second arm and the support platform and thereby torsionally biasing the second arm and the support platform about the pivotal connection therebetween and toward each other. The third spring is preferably a torsion spring.

Although it is contemplated that a pair of wheels could be used for supporting the support platform, preferably a sliding plate is provided on the lower surface of the support platform in a manner whereby when the support platform is in its extended in use or ride behind position, the sliding plate comes in contact with and slides on the surface therebelow. For decreasing the frictional forces between the sliding plate and the ground surface, preferably the sliding plate is made of ultra high molecular weight polyethylene (UHMWPE).

In one form thereof, the present invention is directed to an apparatus attachable to a self-propelled vehicle for transporting an operator therebehind. The apparatus includes an arm having a first end and a second end. The arm first end is adapted to be pivotally attached to a self-propelled vehicle and pivot about a generally horizontally disposed axis of rotation. An operator support platform is affixed to the arm second end and is pivotable with the arm about the axis of rotation. The arm and support platform are selectively pivotable between a storage position and an in use position. In the in use position, the support platform is in contact with and slides on the surface therebelow for carrying and transporting an operator behind the self-propelled vehicle.

In one form thereof, the present invention is directed to an apparatus attachable to a self-propelled vehicle for transporting an operator therebehind. An arm is provided having a first end and a second end. The arm first end is adapted to be pivotally attached to a self-propelled vehicle and pivot about a generally horizontally disposed first axis of rotation. An operator support platform is provided and is pivotally attached to the arm second end and is adapted to pivot about a second axis of rotation also generally horizontally disposed and being generally parallel to the first axis of rotation. The arm and support platform are selectively pivotable about the first and second axes of rotation for placing the platform in a retracted storage position and in an extended in use position for carrying and transporting an operator behind the self-propelled vehicle.

BRIEF DESCRIPTION OF THE DRAWINGS

The above-mentioned and other features and objects of this invention and the manner of obtaining them will become more apparent and the invention itself will be better understood by reference to the following description of embodiments of the invention taken in conjunction with the accompanying drawings wherein:

FIG. 9 is a cross sectional view taken generally along line 7—7 of FIG. 5 and showing the apparatus further extended between its storage and in use positions;

FIG. 10 is a cross sectional view taken generally along line 7—7 of FIG. 5 and showing the apparatus in its fully extended in use or ride behind position;

FIG. 17 is a side elevation view of the apparatus shown in FIG. 14 in its storage position attached to a self-propelled lawn mower and further showing a strap extending downwardly therefrom in accordance with principles of the present invention;

FIG. 18a is a side elevation view of the apparatus shown in FIG. 14 attached to a lawn mower in its retracted storage position and further showing a step member affixed to the support platform in accordance with the principles of the present invention;

Corresponding reference characters indicate corresponding parts throughout the several views of the drawings.

The exemplifications set out herein illustrate preferred embodiments of the invention in one form thereof and such exemplifications are not to be construed as limiting the scope of the disclosure or the scope of the invention in any manner.

DETAILED DESCRIPTION OF SPECIFIC EMBODIMENTS

Figure 1:
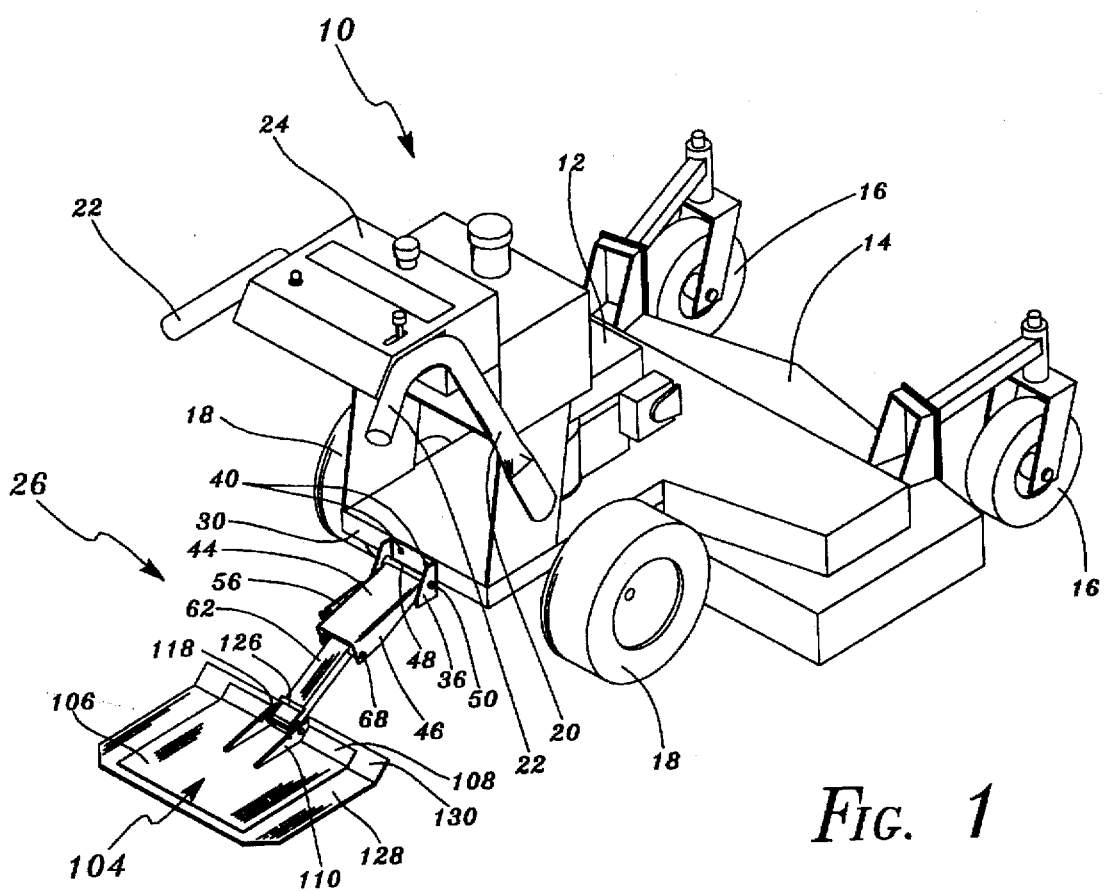
FIG. 1 is a perspective view of a combination self-propelled lawn mower and apparatus for transporting an operator therebehind constructed in accordance with the principles of the present invention.

Referring initially to FIG. 1, there is shown a self-propelled vehicle and, more specifically, a self propelled lawn mower generally designated by the numeral 10. Lawn mower 10 includes a combustion engine 12, mower deck 14, front caster wheels 16, and rear driven wheels 18. Combustion engine 12 is adapted to and powers mower deck 14 and rear driven wheels 18 in a known and customary manner. Self-propelled lawn mower 10 further includes a pair of arms 20 and handles 22 whereat wheel drive controls are located (not shown) and through which the left and right driven wheels 18 are selectively engaged for steering lawn mower 10 in a known and customary manner. Control panel 24 is also provided on lawn mower 10 whereat additional machinery and components of lawn mower 10 i.e., mower deck height, engine speed, overall mower speed, etc., can be monitored and/or controlled.

Figure 2:
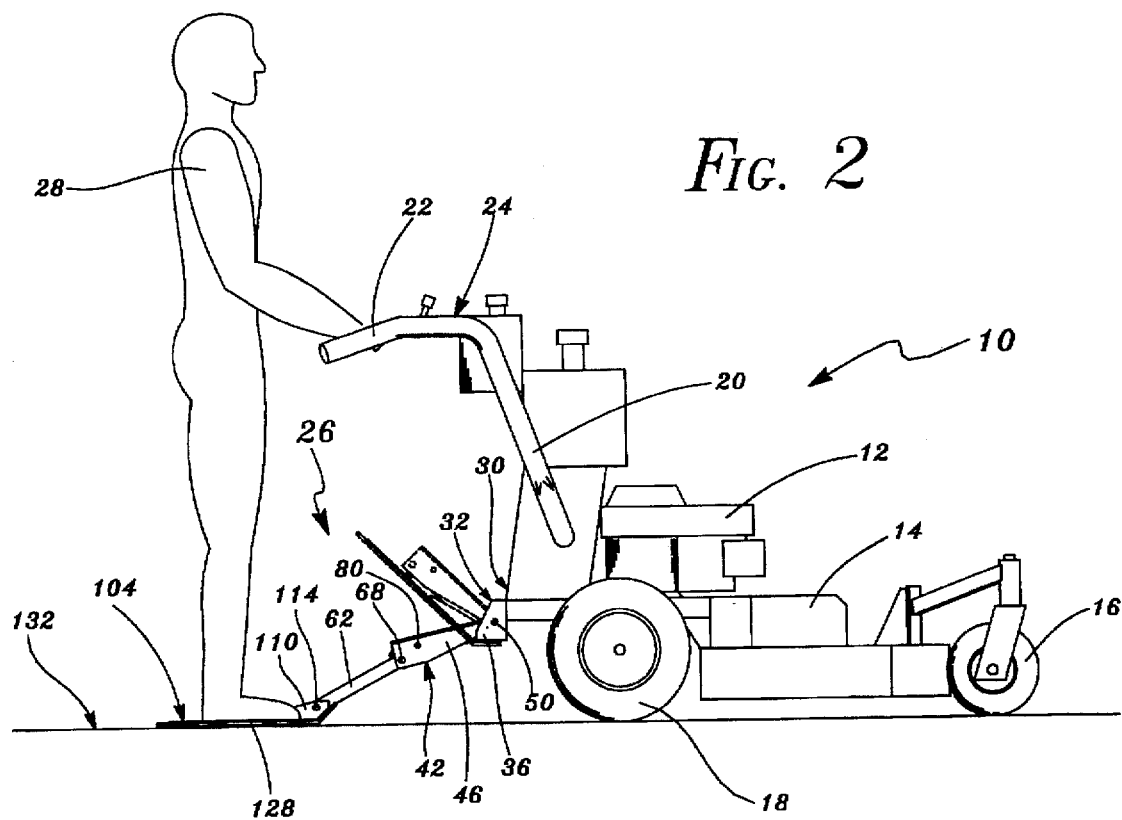
FIG. 2 is a side elevation view of the self-propelled lawn mower and apparatus for transporting an operator shown in FIG. 1 and further diagrammatically showing an operator being transported thereon.

Self-propelled lawn mower 10 is further equipped with an apparatus generally designated by the numeral 26 for carrying and transporting an operator generally depicted by the numeral 28 as shown in FIG. 2. Apparatus 26 is attached to rear wall 30 of lawn mower 10 preferably via an attachment member 32. Attachment member 32 is generally U-shaped including a lower web portion 34 located inbetween upright walls 36. A plurality of holes 38 are provided through lower web portion 34 and bolts 40 extend through holes 38 thereby attaching member 32 to rear wall 30 of self-propelled lawn mower 10. Attachment member 32 is preferably made of steel with upright walls 36 being bent perpendicularly with respect to lower web portion 34.

A first arm 42 is also provided and is generally U-shaped including a web portion 44 and upright walls 46. First arm 42 is also preferably made of steel with upright walls 46 being bent perpendicularly with respect to web portion 44.

At one longitudinal end thereof first arm 42 is provided with a cylindrical member 48. Cylindrical member 48 is also made of steel and is affixed to first arm 42 by welding or other suitable means. In the alternative, cylindrical member 48 can be formed by bending an end section of web portion 44 so as to form an integral cylindrical member. First pin 50 is received through holes 52 in upright walls 36 and through cylindrical member 48 thereby pivotally connecting first arm 42 to attachment member 32. Accordingly, first arm 42 and attachment member 42 are rotatable with respect to one another about first pivot axis 54 shown in FIG. 3.

Figure 4:
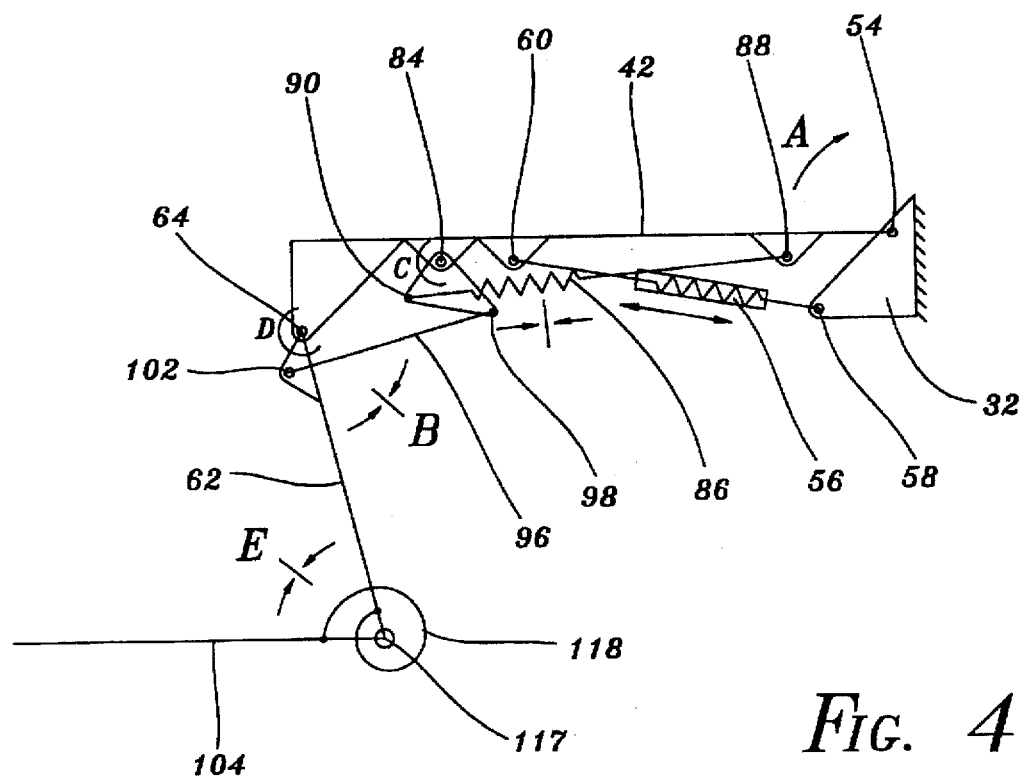
FIG. 4 is a linkage schematic diagram of the apparatus shown in FIG. 3.
Figure 5:
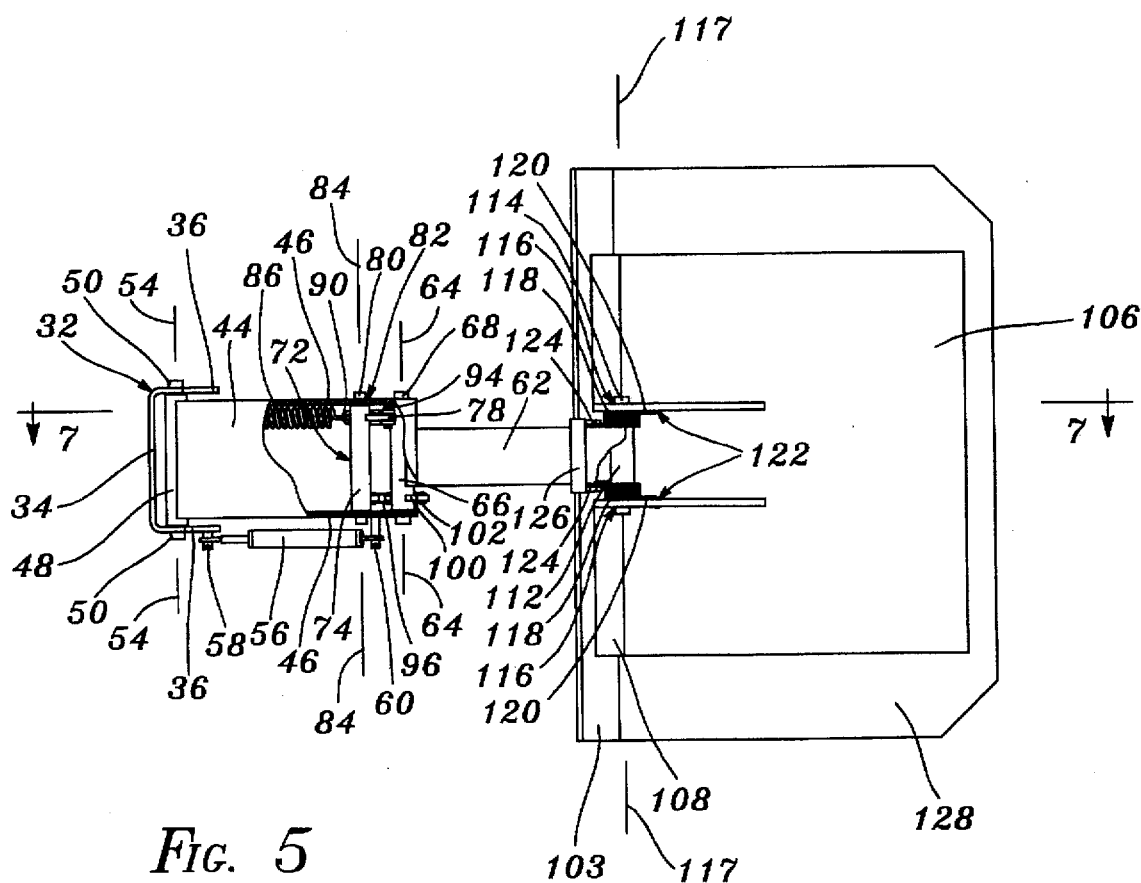
FIG. 5 is a top plan view with a partial cut-away section of the apparatus shown in FIG. 3.
Figure 6:
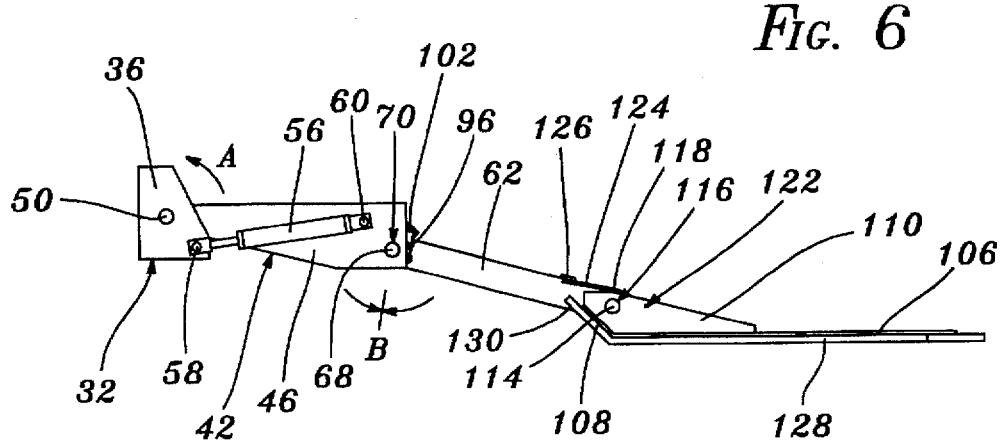
FIG. 6 is a side elevation view of the apparatus shown in FIG. 3.

As best shown in FIGS. 4-6, a first spring member 56 is pivotally connected between attachment member 42 and first arm 42 via a stud 58 protruding from attachment member upright wall 36 and a stud 60 protruding from one of the first arm upright walls 46. Spring member 56 is preferably a compression spring, pneumatic cylinder or gas spring and, due to the location of pivot axis 54 and studs 58 and 60, first spring member 56 biases first arm 42 about pivot axis 54 and generally upwardly as indicated by arrow A. It is noted that a tension spring could be used for spring member 56 by locating stud 58 on attachment member 32 or lawn mower rear wall 30 at a location vertically above pivot axis 54.

At the other longitudinal end of first arm 42 a second arm 62 is provided and is pivotally connected to first arm 42 so that first arm 42 and second arm 62 can rotate with respect to one another about second pivot axis 64. Second arm 62 is preferably made of square or rectangularly-shaped steel tubing and at one longitudinal end thereof is provided with a cylindrical member 66. Cylindrical member 66 is also made of steel and is affixed to second arm 62 by welding or other suitable means. A second pin 68 is received through holes 70 of first arm upright walls 46 and through cylindrical member 66 and thereby allowing first arm 42 and second arm 62 to rotate with respect to one another about pivot axis 64.

Referring now more particularly to FIGS. 4, 5, and 7-10, there is shown a spring mechanism for biasing first arm 42 and second arm 62 toward one another about pivot axis 64 as indicated by arrows B. In this regard, a pivot member 72 is provided and includes cylindrical member 74 made of steel and having dogs 76 and 78 also made of steel affixed thereto by welding or other suitable means. Dogs 76 and 78 protrude radially outwardly from cylindrical member 74 and are spaced as shown approximately 60 to 80 degrees apart from one another. A pin 80 extends through holes 82 through first arm upright walls 46 and through cylindrical member 74 and thereby allowing cylindrical member 74 and dogs 76 and 78 affixed thereto to rotate about pivot axis 84.

A tension spring 86 at one end 88 thereof is connected to a portion of first arm 44 near cylindrical member 48. At the other end 90 of spring 86, spring 86 is connected to a generally V-shaped hook member 92. Hook member 92 at its other end thereof is pivotally connected via pivot pin 94 to dog 78. Dog 76 is pivotally connected to a coupling member such as a steel wire or a chain 96 via a pivot pin 98 and at its other end thereof is pivotally connected to dog 100 via a pivot pin 102. Similar to dogs 78 and 76, dog 100 is made of steel and is affixed to cylindrical member 66 by welding or other suitable means. Dog 100 extends radially outwardly from cylindrical member 66 at an angle of about 50 to 70 from second arm 62.

Figure 7:
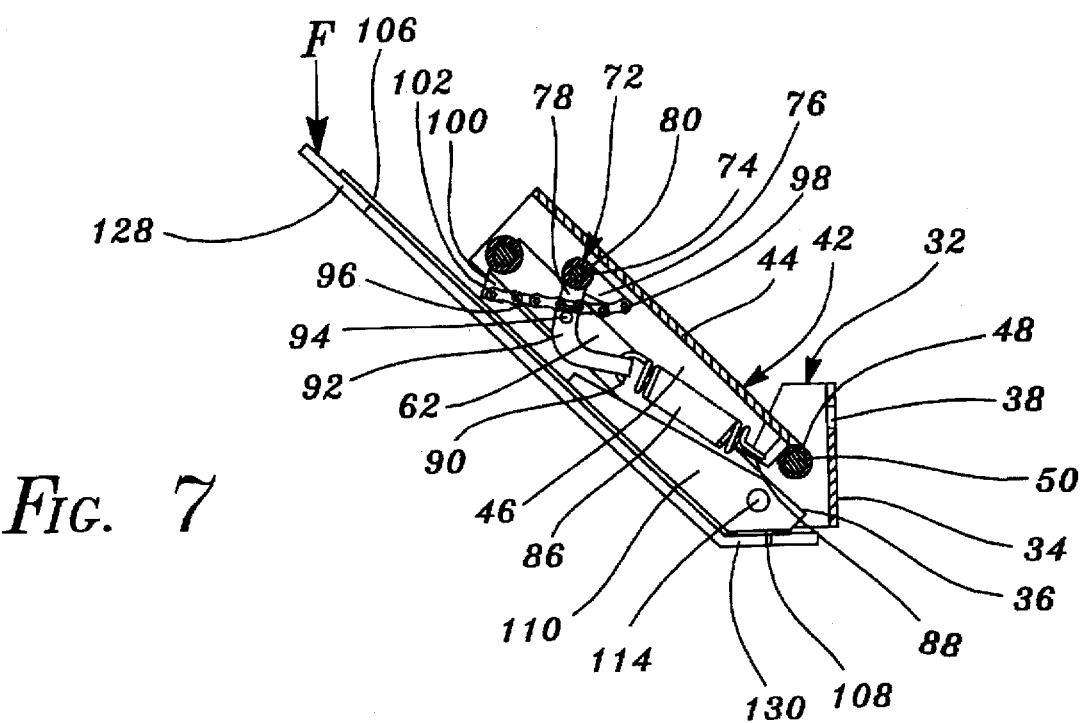
FIG. 7 is a cross-sectional view taken along line 7—7 of FIG. 5 and showing the apparatus in its retracted storage position.

In operation, tension spring 86 biases pivot member 72 in the direction indicated by arrow C. This, in turn, places chain 96 in tension and thereby biasing second arm 62 to pivot about axis 64 as indicated by arrows B and D. Advantageously, as shown in FIG. 7 whereat apparatus 26 is shown in its retracted storage position, dogs 78 and 100 are located generally perpendicular to their respective axes of rotation 84 and 68 and, also, perpendicular to the force provided by respective tension spring 86 and chain 96. Accordingly, when apparatus 26 is in its retracted position, a maximum torsional force is provided between first arm 42 and second arm 62 as indicated by arrows B and arrow D. First arm 42 and second arm 62 are thereby securely retained in their storage position whereat they are generally parallel to one another but in different planes.

Figure 8:
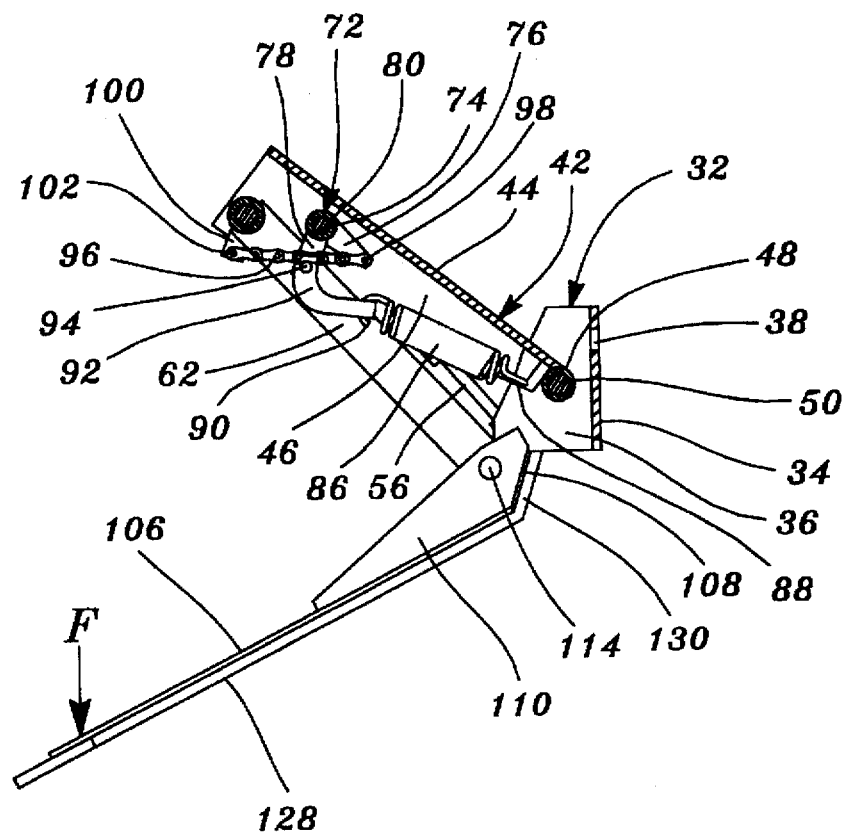
FIG. 8 is a sectional view taken along line 7—7 of FIG. 5 and showing the apparatus partially extended between its storage and in use positions.

As arms 42 and 62 are caused to pivot about axis 64 against the biasing force of spring 86 as shown in FIGS. 8 and 9, a torsional force continues to be applied. This is because the force of tension spring 86 continues to be applied at pin 94 at a radial distance from pivot axis 84. However, when apparatus 26 reaches its final extended or in use position as shown in FIG. 10 whereat arms 42 and 62 are generally parallel to one another and in the same plane, dog 78 has pivoted sufficiently so that in cooperation with hook member 92, the applicable force of tension spring 86 to pin 94 for creating a moment about pivot axis 84 is only a short radial distance from pivot axis 84. Therefore, in this position, the torsional force experienced by pivot member 72 and, thus, also between first arm 42 and second arm 62 is minimal.

It is noted that the force provided by spring 86, pivot axis 84, and pivot pin 94 are not allowed to become aligned and dog 78 is not allowed to pivot to a point where the torsional force about cylindrical member 72 is in a direction opposite that of arrow C since this would tend to lock or otherwise retain the apparatus in its extended in use position. Rather, it is preferred that a slight torsional force in the direction of arrow C and as indicated by arrows B continue to exist even though the apparatus is in its fully extended in use position as shown in FIG. 10. It is also noted that in this extended in use position, chain 96 is partly wrapped around cylindrical member 66, but, since it remains in tension, continues to provide a tangential force to dog 100 at pin 102. Again, the effective radial distance between the pivot axis 64 and the application of the tensional force of chain 96 is minimized since chain 96 is displaced by cylindrical member 66.

At its other longitudinal end, second arm 62 is pivotally connected to a support platform 104 whereupon the operator 28 may stand as shown in FIG. 2 while riding behind self-propelled lawn mower 10. Support platform 104 includes a standing plate 106 with a front angular wall 108 extending at an angle of about 35 to 55 degrees therefrom at the forward end of standing plate 106. Standing plate 106 and angular wall 108 are preferably made of steel or aluminum and include a plurality of projections (not shown) on the upper surface thereof for preventing operator 28 from potentially slipping thereon. A pair of upright walls 110 also made of steel or aluminum are located generally parallel to one another and perpendicular to standing plate 106 and angular wall 108. Upright walls 110 are affixed to plate 106 and wall 108 by welding or other suitable means.

Similar to the other end of second arm 62 a cylindrical member 112 is provided and is affixed to second arm 62. Cylindrical member 112 is made of steel and is affixed to second arm 62 by welding or other suitable means. A platform pin 114 extends through holes 116 through upright walls 110 and also through cylindrical member 112. Accordingly, support platform 104 and second arm 62 pivotally rotate with respect to one another about pivot axis 117.

A pair of torsion springs 118 are provided around cylindrical member 112 and include a first torque arm 120 connected to upright walls 110 through holes 122. The second torque arms 124 of torsion springs 118 are connected to second arm 62 by placement under beam 126 made of steel and affixed to second arm 62 by welding or other suitable means. As indicated by arrows E, torsion springs 118 pivotally bias support platform 104 and second arm 62 with respect to one another about pivot axis 117 and toward each other as also shown in FIGS. 7–10.

Support platform 104 further includes a sliding plate member 128 below standing plate 106 and forward sliding plate wall 130 generally below front angular wall 108. Sliding plate 128 and plate wall 130 are made of ultra high molecular weight polyethylene (UHMWPE) and rest on the ground 132 i.e., grass, dirt, concrete, etc., when apparatus 26 is in its fully extended in use position and the operator is standing thereon as shown in FIG. 2. It has been found that the frictional forces between sliding plate 128 and the ground 130 are generally negligible with respect to the overall apparatus, especially when the UHMWPE material is used. In the alternative, it is also contemplated that a pair of wheels with an axle therebetween can be used with respect to support platform 104 and thereby avoiding the need of a sliding plate member.

Figure 11:
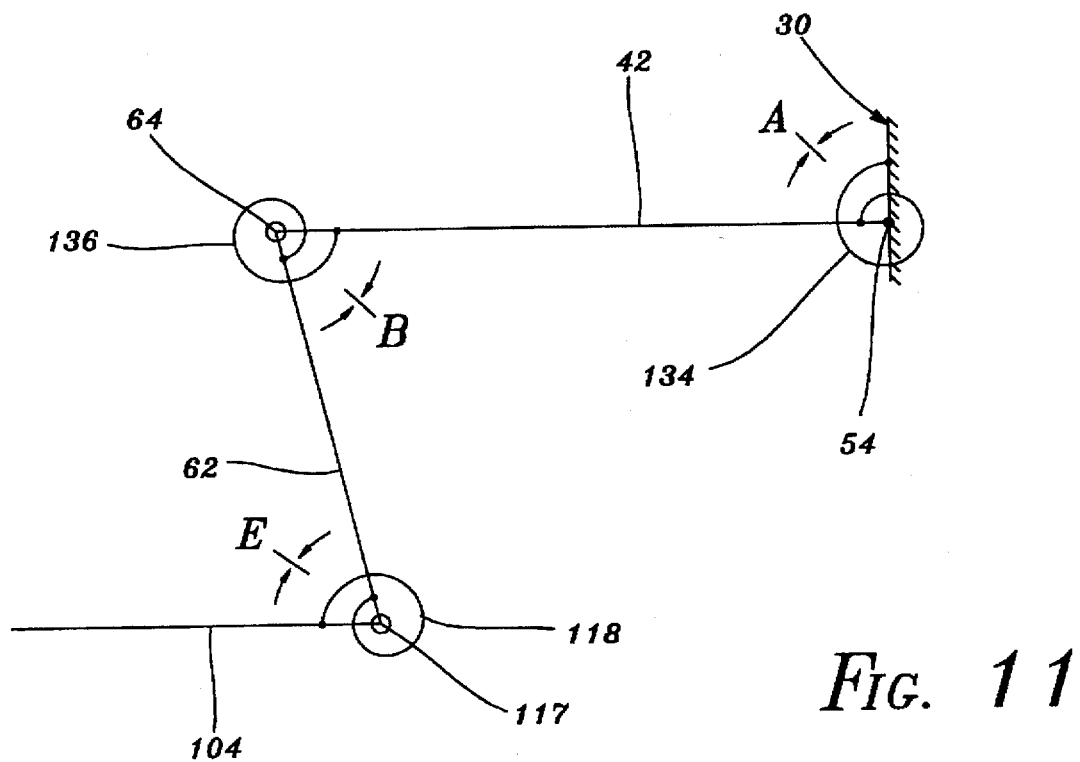
FIG. 11 is a linkage schematic diagrammatically depicting a second embodiment of an apparatus attached to a self-propelled vehicle for transporting an operator therebehind.

In FIG. 11, there is shown a different embodiment wherein a torsion spring 134 is used in place of first spring member 56 and first arm 42 is pivotally connected directly to rear wall 30 of lawn mower 10 and so as to rotate about pivot axis 54. Additionally, a torsion spring 136 is used and is connected between first arm 42 and second arm 62 for biasing arms 42 and 62 toward each other as indicated by arrows B.

Figure 3:
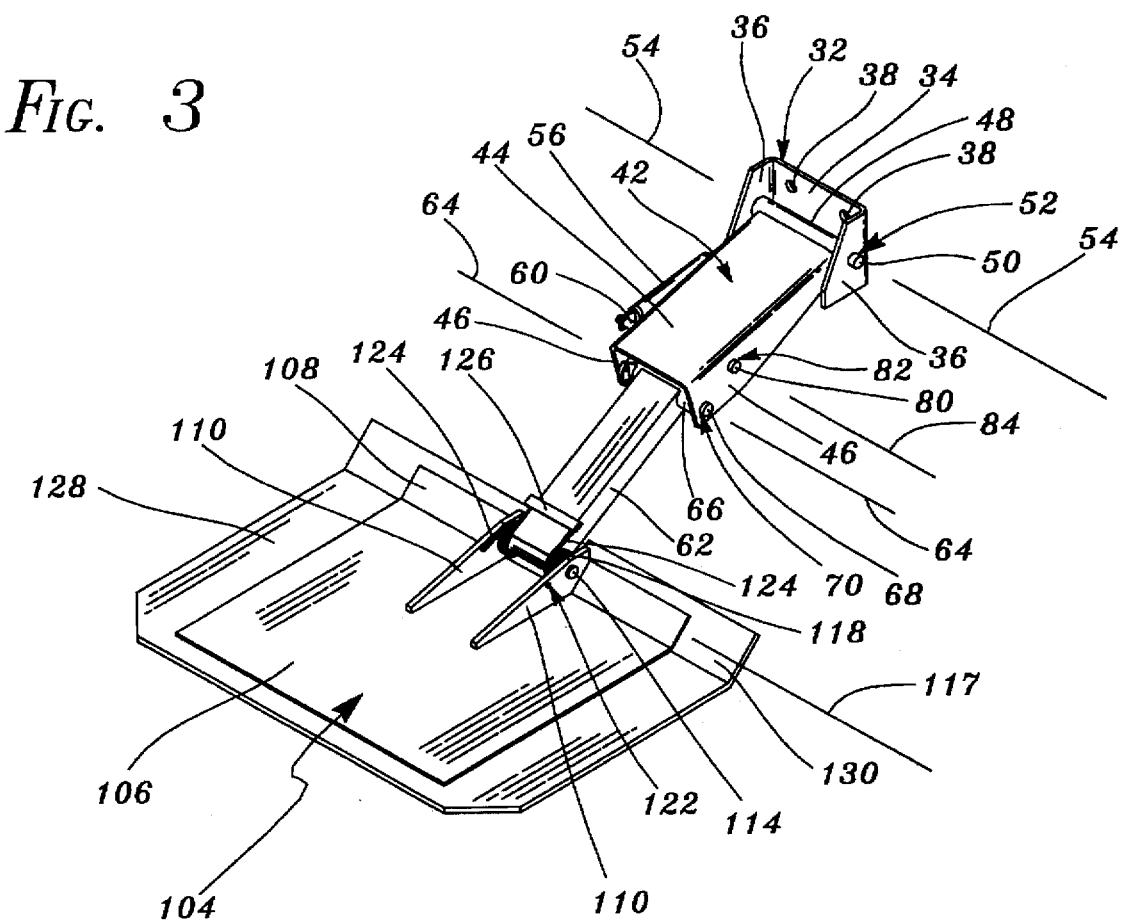
FIG. 3 is a perspective view of an apparatus attachable to a self-propelled vehicle for transporting an operator therebehind constructed in accordance with the principles of the present invention.

In operation, when apparatus 26 is in its retracted storage/walk behind position, it is as shown in dashed lines in FIG. 2 and as shown in FIG. 7 whereat the first arm 42, second arm 62 and support platform 104 are positioned generally parallel to one another but in different planes. When the operator 28 is desirous of using apparatus 26 in the extended ride behind mode, he merely reaches up with his foot and steps on the support platform 104 as indicated by arrow F in FIG. 7. The operator acts against the spring forces of the apparatus initially causing the support platform to be pivoted downwardly as indicated in FIG. 8. Thereafter, self-propelled lawn mower 10 is caused to move forwardly and thereby causing further pivotal motion between the various components and about pivot axes 54, 46, and 117 until apparatus 26 is fully extended as shown in FIGS. 1, 3 and 10. The operator then merely stands on support platform 104 riding behind the lawn mower and controlling speed, direction, etc., in a normal and customary manner. When the operator desires to walk behind the lawn mower, he merely steps off of support platform 104 allowing the spring loaded apparatus 26 to be automatically retracted back in its storage position as shown in FIG. 7. As can be appreciated, this process can be repeated as often and as may be needed or desirable by the operator depending on the specific use of self-propelled lawn mower 10.

Figure 12:
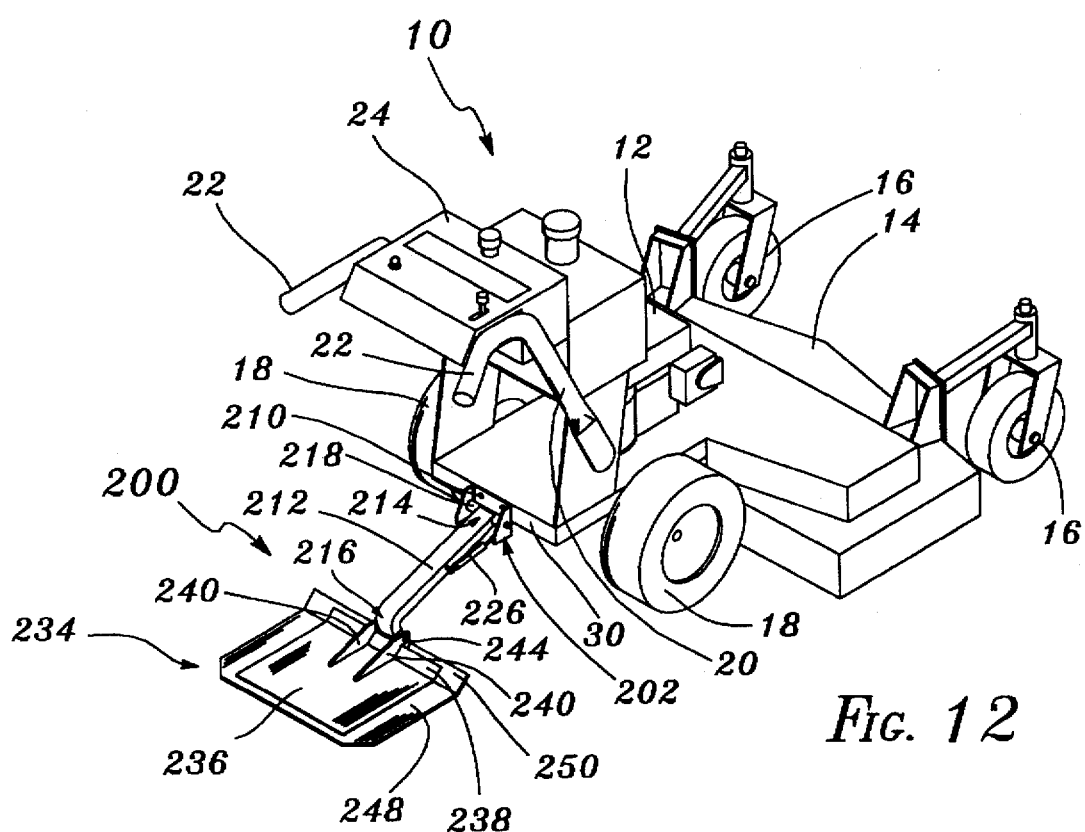
FIG. 12 is a perspective view of a combination self-propelled lawn mower and another embodiment of an apparatus for transporting an operator therebehind constructed in accordance with the principles of the present invention.

Referring now to FIG. 12, there is shown another embodiment wherein the inventive apparatus is generally depicted by the numeral 200. Similar to apparatus 26, apparatus 200 is adapted to be used with a self-propelled vehicle such as a self-propelled lawn mower generally designated by the numeral 10. Here, lawn mower 10 also includes a combustion engine 12, mower deck 14, front caster wheels 16, and rear driven wheels 18. A control handle assembly is also provided with self-propelled lawn mower 10 and includes at least a pair of arms 20 and handles 22 whereat wheel drive controls are located (not shown) and through which the left and right driven wheels 18 are selectively engaged for steering lawn mower 10 in a known and customary manner. A control panel 24 is also provided whereat additional components of lawn mower 10 can selectively be monitored and/or controlled.

Similar to apparatus 26, apparatus 200 is attached to rear wall 30 of lawn mower 10 either directly or preferably, as shown, via an attachment member 202. Attachment member 202 is generally U-shaped and includes a lower web portion 204 located inbetween upright walls 206. A plurality of holes 208 are provided through lower web portion 204 and bolts 210 extend through holes 208 and corresponding holes in rear wall 30 (not shown) thereby attaching attachment member 202 to rear wall 30 of self-propelled lawn mower 10. Similar to attachment member 32, attachment member 202 is preferably made of steel with upright walls 206 being bent perpendicularly with respect to lower web portion 204.

Figure 16:
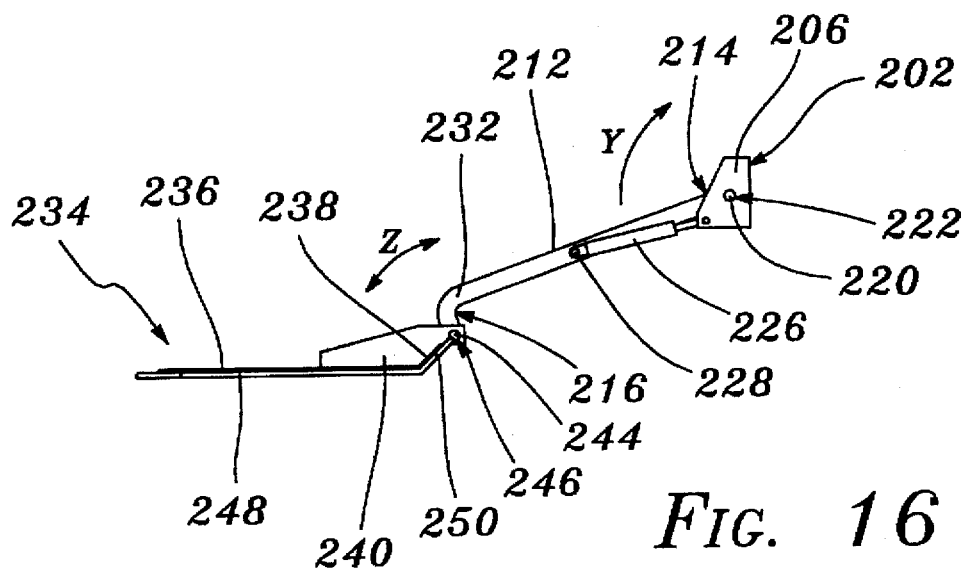
FIG. 16 is a side elevation view of the apparatus shown in FIG. 14.

Apparatus 200 includes a first arm 212 having a first end 214 and a second end 216. First arm 212 is preferably made of square or rectangularly-shaped steel tubing, although is contemplated that it can be made of other materials such as alumninum or plastic and in other shapes such as a U-channel. At the first arm second end 216, first arm 212 is preferably bent and hook-shaped as best shown in FIG. 16.

Figure 13:
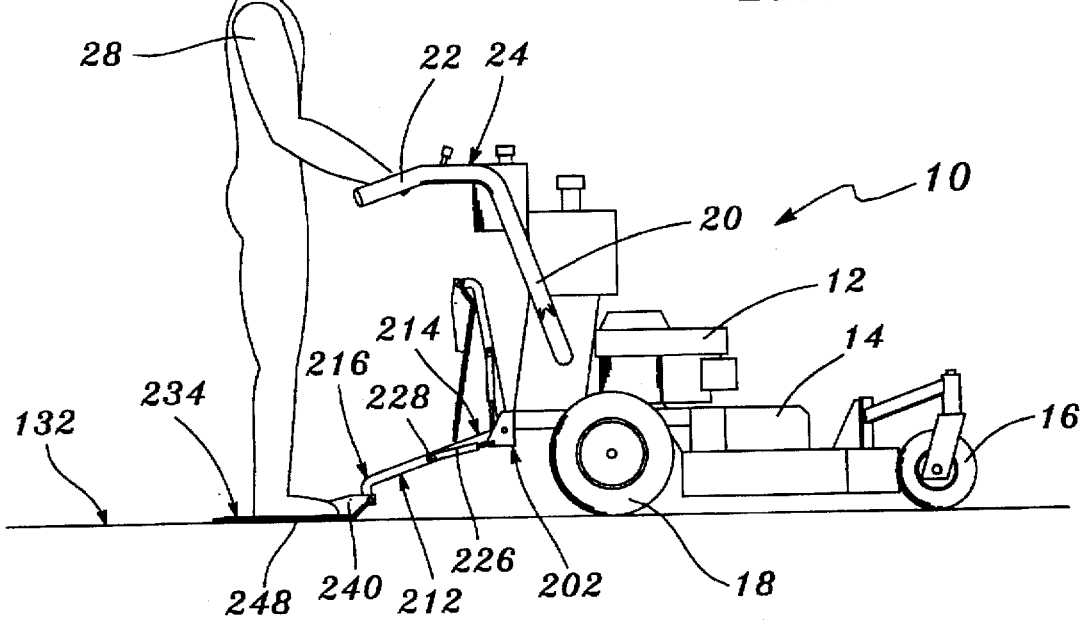
FIG. 13 is a side elevation view of the self-propelled lawn mower and apparatus shown in FIG. 12 and further diagrammatically showing an operator being transported thereon and showing the apparatus in dashed lines in its retracted storage position.
Figure 14:
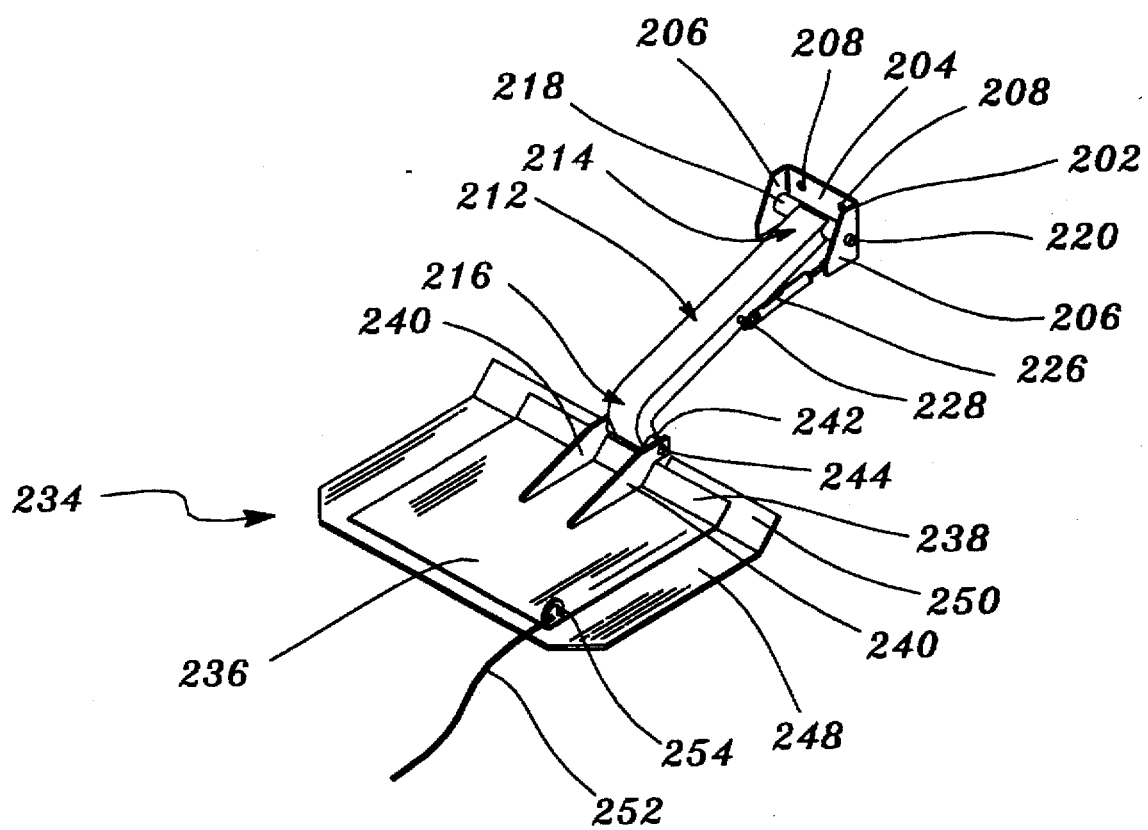
FIG. 14 is a perspective view of the apparatus shown in FIG. 12.
Figure 15:
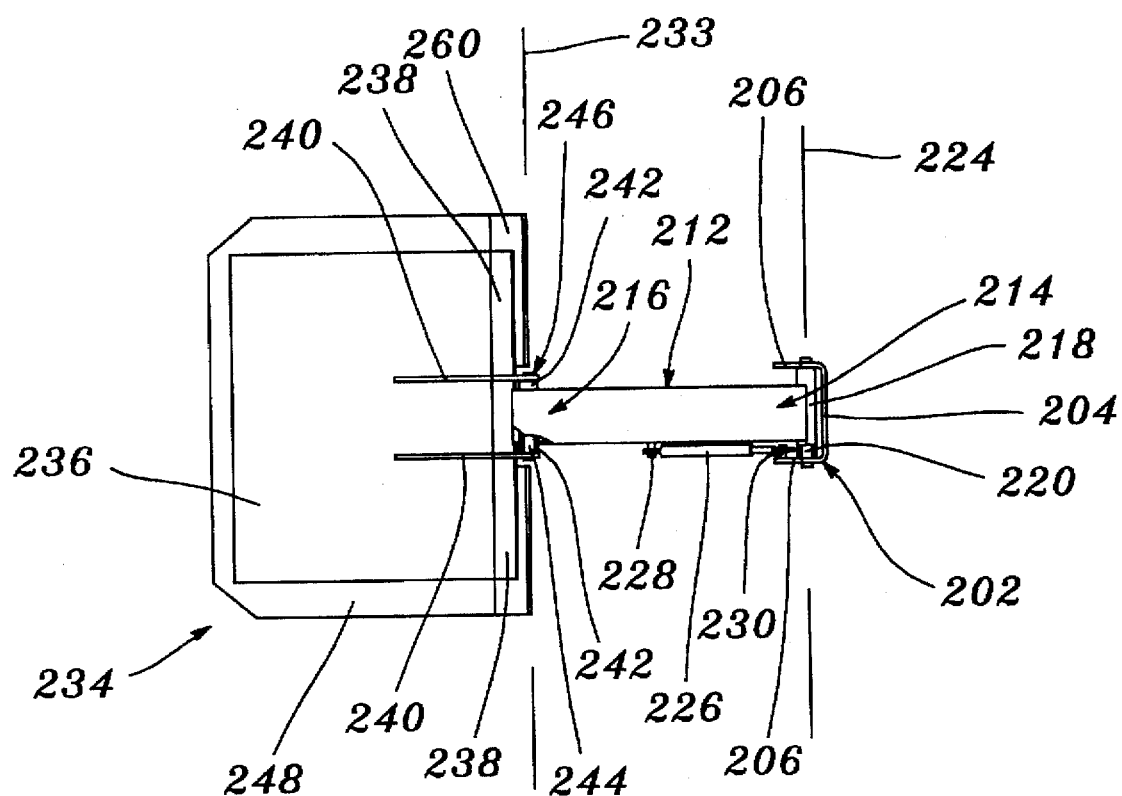
FIG. 15 is a top plan view of the apparatus shown in FIG. 14.

At the first end 214, first arm 212 is provided with a cylindrical member 218 which is also preferably made of steel and which is affixed to first arm 212 by welding or other suitable means. It is noted that cylindrical member 218 can also be formed by bending one or more of the walls forming the square or rectangular tube of first arm 212 thereby forming an integral cylindrical member 218. A first pin 220 is received through holes 222 in upright walls 206 and also through cylindrical member 218. Alternatively, cylindrical member 218 can be dispensed with and replaced with holes drilled through arm 212 and adapted to receive first pin 220. Accordingly, first arm 212 is pivotally connected to attachment member 202 and is rotatable with respect thereto about a first axis of rotation or pivot axis 224. As best shown in FIGS. 12 and 13, attachment member 202 is attached to the rear wall 30 of lawn mower 10 in a manner whereby first axis of rotation 224 is located generally horizontally.

A spring member 226 is pivotally connected between attachment member 202 and first arm 212 preferably via a stud 228 affixed and protruding from first arm 212 and a stud 230 affixed and protruding from an upright wall 206 of attachment member 202. Spring member 226 is preferably a compression spring, pneumatic cylinder or gas spring and, in view of the location of the first axis of rotation 224 as well as studs 228 and 230, spring member 226 biases first arm 212 about the first axis of rotation 224 and generally upwardly as indicted by arrow Y. Although a compression spring 226 is preferred, it is contemplated that a torsion spring could be used for creating a moment and biasing first arm 212 upwardly about the first axis of rotation 224 as indicated by arrow Y. In the alternative, a tension spring could be used by locating stud 230 on attachment member 202 or the lawn mower rear wall 30 at a location vertically above the first axis of rotation 224. It is further noted that spring member 226 is sized and studs 228 and 230 are located in a manner whereby a sufficient biasing force is provided to place the apparatus in a retracted storage position as shown in dashed lines in FIG. 13 while not being so great that it cannot easily be overcome by the operator for placement of the apparatus 200 in its extended in use position as more fully discussed hereinbelow.

At its second end 216, first arm 212 is provided with a bend 232 forming a hook-like shape extending generally downwardly. Additionally, arm 212 is pivotally connected to support platform 234 at its second end 216 in a manner whereby support platform 234 and arm 212 pivot with respect to one another about a second axis of rotation or pivot axis 233. As shown, the second axis of rotation 233 is also generally horizontally disposed and, further, is generally parallel to the first axis of rotation 224. It is noted that this relationship between the first and second axes of rotation 224 and 233 remains true whether the apparatus 200 is in its in use extended position, in its retracted storage position, or in transition between the extended and retracted positions.

Similar to support platform 104 support platform 234 preferably includes a standing plate 236 with a front angular wall 238 at an angle of about 35 to 55 degrees therefrom at the forward end of standing plate 236. Standing plate 236 and angular wall 238 are preferably made of steel or aluminum and include a plurality of projections (not shown) on the upper surface thereof for preventing the operator 28 from potentially slipping thereon. A pair of upright walls 240 also made of steel or aluminum are located generally parallel to one another and perpendicular to standing plate 236 and angular wall 238. Upright walls 240 are affixed to both plate 236 and wall 238 by welding or other suitable means.

Similar to the first end 214, at second end 216 of arm 212 there is provided a cylindrical member 242 which is made of steel and is affixed to arm 212 by welding or other suitable means. A pin 244 extends through holes 246 provided through upright walls 240 and also through cylindrical member 242. It is noted that pins 220 and 244 are retained in their positions as shown by properly sizing the ends thereof and holes 222 and 246 and/or by use of cotter pins or by other suitable means. Accordingly, support platform 234 and arm 212 pivotally rotate with respect to one another about the second axis of rotation 233 as indicated by arrows Z in FIG. 16.

Support platform 234 also further includes a sliding plate member 248 below standing plate 236 and, also, a forward sliding plate wall portion 250 below front angular wall 238. Sliding plate 248 and forward sliding plate portion 250 are preferably made of ultra high molecular weight polyethylene (UHMWPE) and rests on the ground 132 such as grass, dirt, concrete, etc., or other surfaces therebelow when apparatus 200 is in its extended in use position as shown in FIG. 12.

A flexible strap 252 is attached to and extends from an eyelet 254 which is, in turn, affixed to standing plate 236 of support platform 234. Flexible strap 252 is preferably made of twine, rope, leather, or other similar elongate flexible material and is tied to eyelet 254. In the alternative, it is contemplated that flexible strap 252 can be attached to standing plate 236 via an eyelet integrally formed with flexible strap 252 and a bolt selectively attachable to standing plate 236. As best shown in FIG. 17, when apparatus 200 is in its retracted storage position, flexible strap 252 hangs downwardly and at least partially rests on the ground 132.

In operation, the embodiment shown in FIGS. 12-17 remains in its retracted storage position as shown in FIG. 17 and in dashed lines in FIG. 13 thereby allowing the operator 28 to easily walk behind the self-propelled lawn mower 10. That is, spring 226 biases arm 212 rotating it about the first axis of rotation 224 and in a position pointing generally upwardly at a slight angle from the vertical as shown in FIG. 17. Support platform 234 is gravitationally pulled or caused to pivot about the second axis of rotation 233 in a position pointing generally downwardly and, also, at a slight angle from the vertical. In this retracted storage position, as best shown in FIG. 13, apparatus 200 advantageously does not interfere with the operator walking therebehind thereby allowing the operator to maneuver lawn mower 10 as may be desired.

For placing the apparatus 200 in its extended in use position, the operator 28 merely steps on flexible strap 252 before or while the lawn mower 10 is caused to move forwardly. Because the strap 252 is pressed or sandwiched between the operator's foot and the ground and the lawn mower 10 is moving forwardly, strap 252 is placed in tension thereby providing a pulling force at eyelet 254 backwardly along strap 252. This force causes the support platform 234 to pivot about the second axis of rotation 233 away from arm 212 and in a clockwise direction as seen in FIGS. 13 and 17. Simultaneously, arm 212 is caused to pivot in the opposite direction or counterclockwise about the first axis of rotation 224 against the force of spring 226 until, finally, arm 212 and support platform 234 are generally aligned with one another. In the final extended in use position, first arm 212 extends backwardly from lawn mower 10 at a slight angle from the horizontal while support platform 234 rests on the ground 132 or other surface therebelow. The operator 28 then merely steps on the support platform 234 allowing the self-propelled lawn mower 10 to pull apparatus 200 and carrying and transporting the operator 28 thereon. It is noted that sliding plate 238 made of ultra high molecular weight polyethylene greatly reduces the frictional forces and allows the apparatus 200 and the operator 28 thereon to be pulled behind self-propelled lawn mower 10 without unduly loading combustion engine 12 thereof.

When the operator needs to maneuver in tight areas or has completed his task and/or otherwise wishes to step off the apparatus 234 and, for example, merely walk behind lawn mower 10, he merely steps off of support platform 234. With the operator 28 no longer on support platform 234, spring 226 again biases arm 212 upwardly and about the first axis of rotation 224 thereby again placing the apparatus 200 in its storage position.

Referring now to FIGS. 18a and 18b, there is shown an alternate embodiment to flexible strap 252. Here a step member, preferably a rod 256, is affixed to standing plate 236 of support platform 234 and extends outwardly therefrom beyond the support platform 234. Rod 256 is affixed to standing plate 236 by welding or other suitable means. Rod 256 serves substantially the same purpose as flexible strap 252 for placing apparatus 200 in its extended in use position. Here, however, the operator lifts and places his foot on rod 256 pushing the same downwardly either before or while lawn mower 10 is caused to move forwardly. Thus, apparatus 200 is caused to go through similar pivoting motions as described hereinabove with respect to strap 252 and placing the apparatus 200 in its extended in use position.

Figure 19:
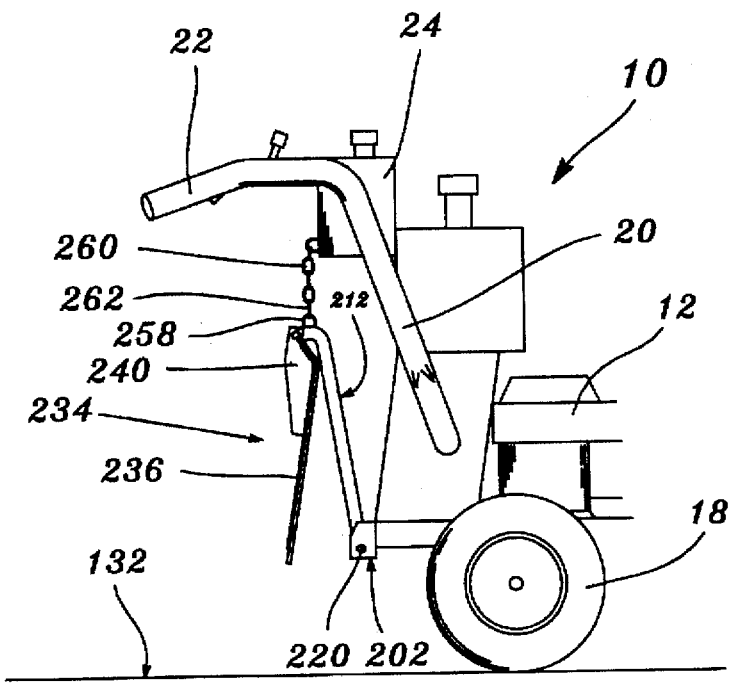
FIG. 19 is a partial side elevation view of a self-propelled lawn mower and apparatus constructed in accordance with the principles of the present invention which is similar to that of FIG. 14 but without a spring member for biasing the apparatus toward its retracted storage position; and, FIG. 20 is a side elevation view of a self-propelled lawn mower and another embodiment of the apparatus constructed in accordance with the principles of the present invention and wherein the arm and support platform are rigidly affixed to one another.

In the embodiment shown in FIG. 19, a spring 226 is not used and arm 212 is not biased upwardly. Accordingly, for placing the apparatus 200 in its retracted storage position, a storage attachment mechanism is provided for selectively attaching and supporting the arm 212 and support platform 234 from and below control arms 20 and handles 22. Preferably, an eyelet 258 is affixed by welding or other suitable means at the second end 216 of arm 212. A chain 260 is attached to the lawn mower 10 below control panel 24 or on handles 22 and includes a hook member 262 at its end thereof. Hook member 262 is adapted to be selectively received through eyelet 258 and thereby support apparatus 200 in its retracted storage position as shown in FIG. 19.

In operation, for placing the apparatus shown in FIG. 19 in its extended in use position, the operator unhooks or otherwise disconnects hook member 262 from eyelet 258 thereby allowing both arm 212 and support platform 234 to fall downwardly. Here, the operator either uses his hands to properly pivot support platform 234 with respect to arm 212 or again causes lawn mower 10 to move forwardly so as to place the apparatus 200 in the extended in use position. Once in its in use position, the operator stands on and uses this apparatus in the same manner as those shown in FIGS. 12-17. For placing the apparatus of FIG. 19 in its retracted storage position, the operator must stop lawn mower 10, lift the support platform 234 and arm 212 upwardly and, finally, place hook member 262 through eyelet 258 again supporting and retaining the apparatus 200 in its retracted storage position.

Figure 20:
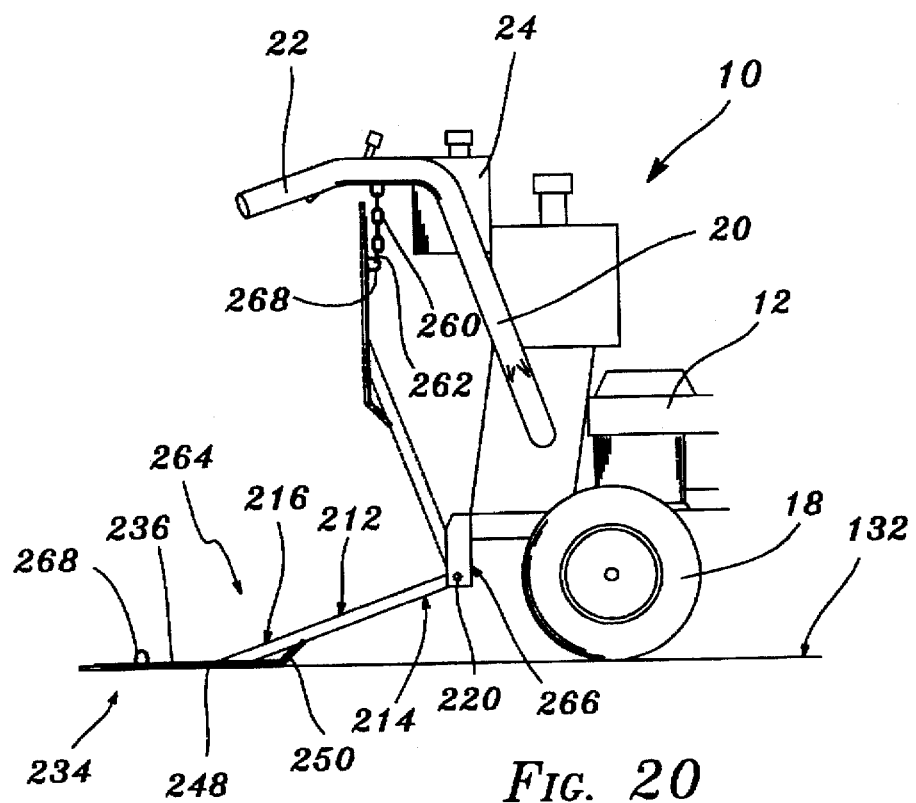

Referring now to FIG. 20, there is shown a yet other embodiment of an apparatus, here generally depicted by the numeral 264. Apparatus 264 is quite similar to apparatus 200 shown in FIGS. 12-19 except that first arm 212 is not pivotally connected with support platform 234. Rather, arm 212 is rigidly affixed to the support platform 234 and the entire apparatus, including arm 212 and support platform 234, pivot about the first axis of rotation 224. More specifically, in this embodiment, the second end 216 of arm 212 is not hook-shaped but, rather, extends directly and is affixed to standing plate 236 by welding or other suitable means. At its first end 214, arm 212 is pivotally connected to an attachment member 266. Attachment member 266 is shaped generally identical to that of attachment member 202 except that it is slightly longer and extends downwardly further. The pivotal connection therebetween is, however, quite similar to that of FIGS. 12-19 incorporating a cylinder 218 and pin 220. Similar to the embodiment of FIG. 19, here, a chain 260 along with a hook member 262 are provided and chain 260 is affixed to and hangs below handle 22 of control arm 20. An eyelet 268 is affixed to standing plate 236 and is adapted to selectively receive hook member 262. Eyelet 268 and chain 260 are affixed to standing plate 236 and handle 22 by welding or other suitable means.

In operation, in the embodiment of FIG. 20, the apparatus 264 is placed in its retracted storage position by pivoting the support platform 234 and arm 212 upwardly and placing the apparatus 264 in a position as shown by dashed lines in FIG. 20. The hook member 262 is placed through eyelet 268 thereby retaining the apparatus in the storage position. For placing the apparatus in its extended in use position, the operator stops the lawn mower 10, disengages the hook member 262 from eyelet 268 and allows the apparatus to pivot about pivot pin 220 and the first axis of rotation 224 downwardly to a position, as shown, wherein the support platform 234 rests on the ground 132 or other surface therebelow. The operator then merely steps on the support platform 234 and by controlling the self-propelled lawn mower 10 is carried and transported therebehind on the apparatus 264 as with the above-described embodiments. For placing the apparatus back in its storage position, the operator again stops the lawn mower 10, steps off of the apparatus 264 and lifts it upwardly pivoting it back in the storage position whereat it is again retained in place via hook member 262 and chain 260.

As should now be appreciated, in the preferred embodiment a support platform is provided which slides on the ground or other surface therebelow rather than being supported on one or more wheels. Although, as also discussed hereinabove it is contemplated that one or more wheels could be used for supporting the support platform, a sliding platform as described is preferred because it provides a substantially smoother ride to the operator. That is, quite often lawns and other ground surfaces have many holes or dimples in which wheels tend to fall in and out of thereby generally bouncing the support platform and giving the operator a "rough" ride. The sliding platform on the other hand tends to slide over such small holes or dimples thereby providing a substantially smoother ride for the operator. Additionally, when used behind a lawn mower, the sliding platform tends to comb or push down the grass as the support platform slides thereover. This provides a temporary striped grass appearance which is desirable and appears more manicured to consumers.

The apparatus is also advantageous over prior art devices that incorporate a vertical axis of rotation at the connection between the self-propelled vehicle and the operator supporting apparatus. More specifically, prior apparatus that are pivotally connected in this fashion tend to pivot to an angle with respect to back wall of the vehicle as the vehicle is turned to the left or right. Because the vehicle control handles are affixed and extend directly behind the vehicle, when the vehicle is turned, the prior art apparatus and the operator are displaced to the left or right thereby forcing the operator to adjust accordingly and stretch over so as to continue to hold on to the control handles. Unlike the prior art, the apparatus of the present invention as described hereinabove is preferably not pivotable about a vertical axis. Rather, the apparatus is adapted to pivot about generally horizontally disposed axes of rotation such as axes 224 and 223. Apparatus 200 and support platform 234, for example, tend to always be located directly behind the self-propelled lawn mower 10, and generally in the same position with respect to control handles 22 and control panel 24. Accordingly, the operator need not stretch to retain control of the vehicle. This decreases fatigue while allowing the operator to retain substantially better control of the self-propelled vehicle.

While the invention has been described as having specific embodiments, it will be understood that it is capable of further modifications. This application is, therefore, intended to cover any variations, uses, or adaptations of the invention following the general principles thereof and including such departures from the present disclosure as come within known or customary practice in the art to which this invention pertains and fall within the limits of the appended claims.

What is claimed is:

1. An apparatus attachable to a self-propelled vehicle for transporting an operator therebehind, said apparatus comprising;

an arm having a first end and a second end, said arm first end adapted to be pivotally attached to a self-propelled vehicle and pivot about a generally horizontally disposed axis of rotation;

an operator support platform affixed to said arm second end and being pivotable with said arm about said axis of rotation;

wherein said arm and support platform are selectively pivotable between a storage position and an in use position;

wherein in said in use position, said support platform is in contact with and slides on the surface therebelow for carrying and transporting an operator behind the self-propelled vehicle; and, wherein said self-propelled vehicle is a self-propelled lawn mower, and wherein said arm is pivotally attached to said self-propelled lawn mower.

2. The apparatus of claim 1 wherein said support platform includes a sliding plate, whereby when said support platform is in said in use position said sliding plate comes in contact with and slides on the surface therebelow.

3. The apparatus of claim 2 wherein said sliding plate is made of ultra high molecular weight polyethylene.

4. The apparatus of claim 1 further comprising an attachment member selectively attachable to said self-propelled lawn mower and wherein said arm first end is pivotally attached to said attachment member.

5. The apparatus of claim 4 wherein said support platform includes a sliding plate made of ultra high molecular weight polyethylene, whereby when said support platform is in said extended in use position said sliding plate comes in contact with and slides on the surface therebelow.

6. The apparatus of claim 1 wherein said self-propelled lawn mower includes a control handle assembly, said arm being pivotally attached to said self-propelled lawn mower, and further including storage attachment means for selectively attaching and supporting said arm and support platform from said lawn mower control handle assembly.

7. The apparatus of claim 6 wherein said support platform includes a sliding plate made of ultra high molecular weight polyethylene, whereby when said support platform is in said extended in use position said sliding plate comes in contact with and slides on the surface therebelow.

8. An apparatus attachable to a self-propelled vehicle for transporting an operator therebehind, said apparatus comprising:

an arm having a first end and a second end, said arm first end adapted to be pivotally attached to a self-propelled vehicle and pivot about a generally horizontally disposed first axis of rotation;

an operator support platform pivotally attached to said arm second end and adapted to pivot about a second axis of rotation also generally horizontally disposed and being generally parallel to said first axis of rotation, whereby said arm and support platform are selectively pivotable about said first and second axes of rotation for placing said platform in a retracted storage position and in an extended in use position for carrying and transporting an operator behind the self-propelled vehicle; and, wherein said self-propelled vehicle is a self-propelled lawn mower, and wherein said arm is pivotally attached to said self-propelled lawn mower.

9. The apparatus of claim 8 wherein said support platform includes a sliding plate, whereby when said support platform is in said in use position said sliding plate comes in contact with and slides on the surface therebelow.

10. The apparatus of claim 9 wherein said sliding plate is made of ultra high molecular weight polyethylene.

11. The apparatus of claim 8 further comprising an attachment member selectively attachable to said self-propelled lawn mower and wherein said arm first end is pivotally attached to said attachment member.

12. The apparatus of claim 11 further comprising, a spring member connected between said attachment member and said arm biasing said arm generally upwardly.

13. The apparatus of claim 12 wherein said spring is a compression spring.

14. The apparatus of claim 12 wherein said spring is a torsion spring.

15. The apparatus of claim 12 wherein said support platform includes a sliding plate made of ultra high molecular weight polyethylene, whereby when said support platform is in said extended in use position said sliding plate comes in contact with and slides on the surface therebelow.

16. The apparatus of claim 12 further comprising a flexible strap attached to and extending from said support platform and wherein the said platform, is in said retracted storage position said strap extends downwardly and partially rests on the surface therebelow, whereby an operator may selectively step on said strap causing said support platform and arm to pivot about said axes of rotation and against the biasing force of said spring as the vehicle moves forwardly thereby placing said platform in said extended in use position.

17. The apparatus of claim 16 wherein said support platform includes a sliding plate made of ultra high molecular weight polyethylene, whereby when said support platform is in said extended in use position said sliding plate comes in contact with and slides on the surface therebelow.

18. The apparatus of claim 12 further comprising a step member affixed to said support platform, whereby an operator may selectively step on said step member causing said support platform and arm to pivot about said axes of rotation and against the biasing force of said spring thereby placing said platform in said extended in use position.

19. The apparatus of claim 18 wherein said support platform includes a sliding plate made of ultra high molecular weight polyethylene, whereby when said support platform is in said extended in use position said sliding plate comes in contact with and slides on the surface therebelow.

20. The apparatus of claim 8 wherein said self-propelled lawn mower includes a control handle assembly, said arm being pivotally attached to said self-propelled lawn mower, and further including storage attachment means for selectively attaching and supporting said arm and support platform from said lawn mower handle assembly control arm.

21. The apparatus of claim 20 wherein said support platform includes a sliding plate made of ultra high molecular weight polyethylene, whereby when said support platform is in said extended in use position said sliding plate comes in contact with and slides on the surface therebelow.

22. The apparatus of claim of 8 further comprising a spring connected between said lawn mower and said arm, said spring biasing said arm generally upwardly.

23. The apparatus of claim 22 wherein said spring is a compression spring.

24. The apparatus of claim 22 wherein said spring is a torsion spring.

25. The apparatus of claim 22 further comprising a flexible strap attached to and extending from said support platform, and wherein when said platform is in said retracted storage position said strap extends downwardly and partially rests on the surface therebelow, whereby an operator may selectively step on said strap causing said support platform and arm to pivot about said axes of rotation and against the biasing force of said spring as said the vehicle moves forwardly thereby placing said platform in said extended in use position.

26. The apparatus of claim 22 further comprising a step member affixed to said support platform, whereby an operator may selectively step on said step member causing said support platform an arm to pivot about said axes of rotation and against the biasing force of said spring thereby placing said platform in said extended in use position.

* * * * *